United States Patent
Khare et al.

(10) Patent No.: US 12,538,103 B2
(45) Date of Patent: Jan. 27, 2026

(54) MUTE NOTIFICATION CONTROL PROCEDURE

(71) Applicant: NOKIA SOLUTIONS AND NETWORKS OY, Espoo (FI)

(72) Inventors: Saurabh Khare, Bangalore (IN); Colin Kahn, Morris Plains, NJ (US); Apostolos Papageorgiou, Munich (DE); Pallab Gupta, Bangalore (IN); Bahare Masood Khorsandi, Munich (DE); Yannick Lair, Voisins le Bretonneux (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 696 days.

(21) Appl. No.: 17/960,475

(22) Filed: Oct. 5, 2022

(65) Prior Publication Data

US 2023/0107020 A1    Apr. 6, 2023

(30) Foreign Application Priority Data

Oct. 6, 2021 (EP) .................................. 21201221

(51) Int. Cl.
*H04L 47/32* (2022.01)
*H04L 49/9005* (2022.01)
*H04W 4/12* (2009.01)
*H04W 4/60* (2018.01)

(52) U.S. Cl.
CPC ............... *H04W 4/12* (2013.01); *H04W 4/60* (2018.02)

(58) Field of Classification Search
CPC ......... H04W 4/12; H04W 4/60; H04W 24/02; H04W 8/00; H04L 47/32; H04L 49/9005; H04L 67/55
See application file for complete search history.

(56) References Cited

U.S. PATENT DOCUMENTS

2020/0236183 A1 * 7/2020 Ghike .................. H04L 65/611

OTHER PUBLICATIONS

3GPP TS 23.288 V17.2.0 (Sep. 2021), Technical Specification, 3rd Generation Partnership Project; Technical Specification Group Services and System Aspects; Architecture enhancements for 5G System (5GS) to support network data analytics services (Release 17), Sep. 2021.

* cited by examiner

*Primary Examiner* — Joseph E Dean, Jr.
(74) *Attorney, Agent, or Firm* — SQUIRE PATTON BOGGS (US) LLP

(57) ABSTRACT

An apparatus comprising at least one processing circuitry, and at least one memory for storing instructions to be executed by the processing circuitry. The at least one memory and the instructions are configured to, with the at least one processing circuitry, cause the apparatus to send, to a network entity acting as a data provider, at least one request to subscribe to or modify at least one data collection service. The request comprises a mute notification indication indicating that data collected by the at least one data collection service are to be buffered, and a transmission to the data consumer is to be suspended, until a predetermined condition is satisfied. The condition comprises one of a time indication and threshold, and an indication of a procedure to be conducted by the data provider when an exception condition is detected during at least one data collection service.

19 Claims, 8 Drawing Sheets

MUTE NOTIFICATION CONTROL PROCEDURE

CROSS REFERENCE TO RELATED APPLICATION

This application claims the benefit of European Patent Application No. 21201221.5, filed Oct. 6, 2021. The entire content of the above-referenced application is hereby incorporated by reference.

BACKGROUND

Field

Examples of embodiments relate to apparatuses, methods, systems, computer programs, computer program products and (non-transitory) computer-readable media usable for controlling mute notification. Specifically, examples of embodiments relate to apparatuses, methods, systems, computer programs, computer program products and (non-transitory) computer-readable media usable for enabling allow an improved control in mute notification procedure when an exception condition, such as a full buffer, occurs.

Background Art

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:
3GPP 3$^{rd}$ Generation Partnership Project
4G fourth generation
5G fifth generation
5GS 5G system
ADRF analytic data repository function
AF application function
AMF access and mobility function
CPU central processing unit
DCCF data collection coordination function
eNB E-UTRAN Node B
gNB next generation node B
ID identification
IP Internet protocol
LTE Long Term Evolution
LTE-A LTE Advanced
MFAF messaging framework adaptor function
NF network function
NFc consumer network function
NFp provider network function
NW network, network side
NWDAF network data analytics function
OAM operation administration and maintenance
SMF session management function
UDM unified data management
UDSF unstructured data storage function
UE user equipment

SUMMARY

According to an example of an embodiment, there is provided, for example, an apparatus for use by a communication network element or communication network function configured to operate as a data consumer, the apparatus comprising at least one processing circuitry, and at least one memory for storing instructions to be executed by the processing circuitry, wherein the at least one memory and the instructions are configured to, with the at least one processing circuitry, cause the apparatus at least: to send, to a network entity acting as a data provider, at least one request to subscribe to or modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service.

Furthermore, according to an example of an embodiment, there is provided, for example, a method for use in a communication network element or communication network function configured to operate as a data consumer, the method comprising sending, to a network entity acting as a data provider, at least one request to subscribe to or modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service.

According to further refinements, these examples may include one or more of the following features:
- the exception condition impairing buffering of the collected data may comprise comprises at least one of detecting that a buffering capacity for collected data becomes equal to or lower than a preset value, detecting that the buffering capacity for collected data is exhausted, and detecting at least one exceptional condition causing that further buffering is not possible at the data provider;
- the indication of a procedure to be conducted by the data provider may comprise at least one of at least one indication that affects an action to be executed on buffered data of at least one data collection service, at least one indication that affects an action to be executed on a subscription of at least one data collection service, and an instruction to negotiate an action to be executed on buffered data of at least one data collection service and an action to be executed on a subscription of at least one data collection service;
- the action to be executed on buffered data of at least one data collection service may comprise one of transmitting buffered data to the data consumer when the exception condition impairing buffering of the collected data is detected, or discarding buffered data when the exception condition impairing buffering of the collected data is detected, and the action to be executed on the subscription of at least one data collection service may comprise one of terminating the subscription of the at least one data collection service, continuing the at least one data collection service of the subscription and the buffering of the collected data, and continuing the at least one data collection service of the subscription but stopping the buffering of the collected data;

from the data provider, a response to the at least one request to subscribe to or modify at least one data collection service may be received, and the response may be processed, wherein the response may comprise at least one of an indication related to an estimated available buffer capacity and an information related to a changed stop condition being different from the stop condition included in the at least one request to subscribe to or modify at least one data collection service;

when the indication of the procedure to be conducted by the data provider comprises an instruction to negotiate the action to be executed on buffered data of at least one data collection service and the action to be executed on a subscription of at least one data collection service, a notification may be to received from the data provider that an exception condition is detected, wherein the notification may include at least one option for the action to be executed on buffered data of at least one data collection service and the action to be executed on a subscription of at least one data collection service to be selected by the data consumer, from the at least one option, the action to be executed on buffered data of at least one data collection service and the action to be executed on a subscription of at least one data collection service may be selected, and a response to the notification may be transmitted to the data provider, the response indicating the selected action to be executed on buffered data of at least one data collection service and the action to be executed on a subscription of at least one data collection service;

when a plurality of data collection services are subscribed, with the notification that an exception condition is detected, a scope indication may be received from the data provider, defining at least one of the plurality of data collection services for which the exception condition is detected, wherein the action to be executed on buffered data of at least one data collection service and the action to be executed on a subscription of at least one data collection service may be selected for the at least one of the plurality of data collection services indicated by the scope indication;

a prioritization information indicating a priority level for at least one data collection service being subscribed may be prepared, wherein the priority level may indicate an allowability level for actions to be executed for the at least one data collection service when an exception condition is detected, and the data provider may be informed about the prioritization information.

According to an example of an embodiment, there is provided, for example, an apparatus for use by a communication network element or communication network function configured to operate as a data provider, the apparatus comprising at least one processing circuitry, and at least one memory for storing instructions to be executed by the processing circuitry, wherein the at least one memory and the instructions are configured to, with the at least one processing circuitry, cause the apparatus at least: to receive, from a network entity acting as a data consumer, at least one request to subscribe to or to modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service, to conduct the at least one data collection service and to buffer the collected data according to the mute notification indication, to detect whether an exception condition occurs for at least one data collection service, and when the exception condition occurs, to conduct a processing according to the indication of the procedure to be conducted by the data provider.

Furthermore, according to an example of an embodiment, there is provided, for example, a method for use in a communication network element or communication network function configured to operate as a data provider, the method comprising receiving, from a network entity acting as a data consumer, at least one request to subscribe to or to modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service, conducting the at least one data collection service and to buffer the collected data according to the mute notification indication, detecting whether an exception condition occurs for at least one data collection service, and when the exception condition occurs, conducting a processing according to the indication of the procedure to be conducted by the data provider.

According to further refinements, these examples may include one or more of the following features:

the exception condition impairing buffering of the collected data may comprise at least one of detecting that a buffering capacity for collected data becomes equal to or lower than a preset value, detecting that the buffering capacity for collected data is exhausted, and detecting at least one exceptional condition causing that further buffering is not possible at the data provider;

the instruction regarding a procedure to be conducted by the data provider may comprise at least one of at least one indication that affects an action to be executed on buffered data of at least one data collection service, at least one indication that affects an action to be executed on a subscription of at least one data collection service, and an instruction to negotiate an action to be executed on buffered data of at least one data collection service and an action to be executed on a subscription of at least one data collection service;

the action to be executed on buffered data of at least one data collection service may comprise one of transmitting buffered data to the data consumer when the exception condition impairing buffering of the collected data is detected, or discarding buffered data when the exception condition impairing buffering of the collected data is detected, and the action to be executed on the subscription of at least one data collection service may comprise one of terminating the subscription of the at least one data collection service, continuing the at least one data collection service of the subscription and the buffering of the collected data, and continuing the at least one data collection service of the subscription but stopping the buffering of the collected data;

the mute notification indication may be processed, it may be determined whether a sufficient buffer capacity is available for the preset time and, in case the buffer capacity available for the preset time is not sufficient, a response to the at least one request to subscribe to or modify at least one data collection service may be sent to the data consumer, wherein the response may comprise at least one of an indication related to an estimated available buffer capacity and a changed stop condition being different from the stop condition included in the at least one request to subscribe to or modify at least one data collection service;

when the indication of the procedure to be conducted by the data provider comprises at least one indication that affects an action to be executed on buffered data of at least one data collection service and at least one indication that affects an action to be executed on a subscription of at least one data collection service, at least one of the actions indicated in the indications may be selected and the selected at least one action may be executed;

when the indication of the procedure to be conducted by the data provider comprises an instruction to negotiate the action to be executed on buffered data of at least one data collection service and the action to be executed on a subscription of at least one data collection service, when the exception condition occurs, a notification may be sent to the data consumer indicating that the exception condition is detected, wherein the notification may include at least one option for the action to be executed on buffered data of at least one data collection service and the action to be executed on a subscription of at least one data collection service to be selected by the data consumer, a response to the notification to the data provider may be received from the data consumer, the response indicating a selected action to be executed on buffered data of at least one data collection service and the action to be executed on a subscription of at least one data collection service, and the selected actions may be executed;

when a plurality of data collection services are subscribed for one data consumer, to determine a scope indication defining at least one of the plurality of data collection services for which the exception condition is detected, the scope indication together with the notification that an exception condition is detected may be transmitted to the data consumer, wherein the action to be executed on buffered data of at least one data collection service and the action to be executed on a subscription of at least one data collection service may be executed for the at least one of the plurality of data collection services indicated by the scope indication;

prioritization information indicating a priority level for at least one data collection service being subscribed may be obtained, wherein the priority level may indicate an allowability level for actions to be executed for the at least one data collection service when an exception condition is detected, and actions may be executed on subscribed data collection services considering the prioritization information.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

In communication networks, such as 3GPP based networks, data collection can be conducted by different network elements or network functions for different purposes. For example, data collection can be based on subscription to events provided by network functions such as AMF, SMF, UDM, AF, and OAM. Data consumers may be, for example, elements like NWDAFs which require the data for analytics services or the like, or DCCF which is used for data collection coordination and delivery and coordinates the collection and distribution of data requested by NF consumers.

According to 3GPP specifications, NFs representing data consumers (NFc) can ask for data via a DCCF, and the DCCF can then request the data from a data source, i.e. a NF acting as a data provider (NFp). This allows for a coordinated data retrieval, and the data provider (or producer) needs to provide the data once to the DCCF, while the DCCF can distribute it to all requesting NFc.

For illustrative purposes, a network structure based on 3GPP is described in which examples of embodiments can be implemented. Specifically, in the following, a processing is described in which a data consumer can subscribe at a data provider for a data collection service.

Figure 1:
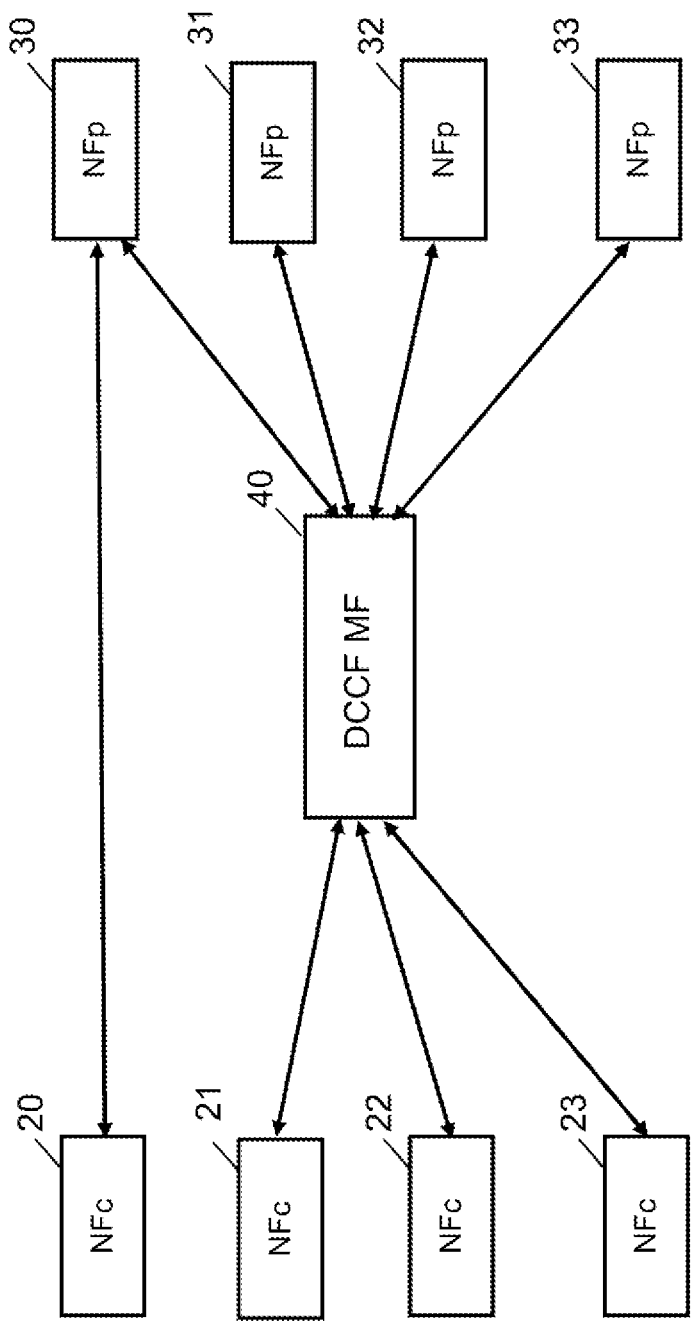
FIG. 1 shows a diagram illustrating an example of a network architecture in which examples of embodiments are implementable.

Specifically, FIG. 1 shows a diagram illustrating an example of a system architecture of a communication network based on 3GPP in which also examples of embodiments are implementable. It is to be noted that the illustration in FIG. 1 mainly shows those parts of a complete network architecture which are useful for understanding principles of embodiments of the disclosure, while other elements and interfaces are omitted in the illustration.

Reference numbers 20 to 23 denote a respective network function (NF) which can be a data consumer according to examples (referred to as NFc). It is to be noted that while FIG. 1 shows four NFc, there may be present less or more NFc in this role. As examples for NFc, NWDAF or AF can be mentioned.

Reference signs 30 to 33 denote a respective network function (NF) which can be a service or data provider according to examples (referred to as NFp). It is to be noted that while FIG. 1 shows four NFp, there may be present less or more NFp in this role. As examples for NFp, AMF, SMF, AF and the like can be mentioned.

Reference sign 40 denotes a DCCF. The DCCF is used for data collection coordination and delivery and coordinates the collection and distribution of data requested by various NFc (here, NFc 21 to 23 request data collection via DCCF). That is, the DCCF 40 represents for the NFp another data consumer.

As indicated by arrows in FIG. 1, data collection can be requested at the NFp either via the DCCF 40 or directly (in case of NFc 20, for example). Furthermore, a NFp may receive requests for data from more than one consumer, and a consumer can also request data from more than one NFp. In some examples, the DCCF may also be implemented via NWDAF. Furthermore, according to some examples, it is also possible that an MFAF is associated with the DCCF.

In order to limit, for example, signaling load between the data consumer (NWDAF, DCCF) and the data provider (e.g. AMF, SMF), additional mechanisms are implemented allowing to limit the signalling between the data provider (also referred to as event producer NF) and the data consumer (also referred to as consumer NF). One example for such a mechanism is the capability of muting the notification of the events while storing for a limited time and limited size the events until the event consumer NF retrieves such mute stored events. For example, in 3GPP, the specification 3GPP TS 23.288 "Architecture enhancements for 5G System (5GS) to support network data analytics services" describes a procedure in which NFs may also collect data from an NFp with event muting.

In a corresponding mechanism for data collection with event muting, a deactivate notification flag is used (representing a mute notification indication), which the consumer NF includes in the subscription to an event ID so as to indicate to the event provider NF to collect, i.e. store the requested events and halt (i.e. suspend) the notification to the consumer. A stop condition may be set which indicates the conditions under which the mute process stops. For example, the number of stored events may be limited based on NF configuration. For example, when the indicated number is reached, the NF continues to store new events and deletes the oldest events.

Furthermore, a retrieval notification flag is used which the event consumer NF includes in an event subscription modification request to indicate to the event producer NF to send the past collected events not already sent to this consumer NF. After sending the past collected events the event producer continues to store events without sending notifications to the event consumer.

The mute notification mechanism allows a data consumer, such as NWDAF, DCCF and the like, to subscribe to events from NFs (NFp) such as AMF and SMF, and thereby avoids constant notifications, while the mute stored events can be retrieved when required.

That is, when a subscribe request contains a "Deactivation Notification Flag", the event provider NF (NFp) will collect and store the requested events (data) but halt the notification to the consumer NF (NFc). The notifications may subsequently be retrieved by the NFc when it sends an event subscription modification request with the "Retrieval Notification Flag" set to indicate to the NFp that the NFp should send the past collected events not already sent to the NFc. After sending the past collected events the NFp continues to store events without sending notifications to the NFc.

Currently, buffering is executed by the NFp (e.g.: AMF, SMF). That is, when using the mechanism of mute notification, the NFp needs to support notification buffering for a possible long duration. Thus, memory or storage requirements at the NFp on a dynamic basis are necessary.

To support buffering by the NFp, there are two options conceivable. One option is to buffer the notifications (i.e. data) in an UDSF (Unstructured Data Storage Function). The UDSF supports data storage for stateless network functions. That is, rather than a given network function holding its own storage resources, it will instead store UE context data in the UDSF. However, this requires that the NFp supports integration with an UDSF.

The other option is that the notifications (data) are buffered locally in a local database or memory at the NFp.

For both options, buffer requirement imposes a restriction on the maximum buffer size used by the NFp. For example, a NFp integrated with UDSF may have a capacity to store X MB data whereas, a NFp storing locally has a capacity to store Y MB data, wherein Y is less than X.

In order to illustrate this, in the following, an example is described where a NFc sends a subscription request to a NFp asking to mute notifications. The NFp accepts the request and starts buffering the notifications. The NFp state may change during this time. For example, after 2 days, NFp resources may be getting full due to multiple NFc(s) asking for similar data with different mute instructions. Therefore, the NFp is no longer able to store the further notifications as requested by the first NFc, and older notifications must be dropped, as indicated above.

One way to deal with this problem is to increase the dimensioning of buffer capacity at the NFp side. However, this may not be sufficient because consumers may want the notifications to be held for a long period of time (e.g. many days). Furthermore, in cases when an event frequency at the data source is high, the buffer can become full earlier than expected. As an example, UE reachability notification (data) may to be stored in an AMF. But if the user/UE is traveling where the mobile signal fluctuates then there will be a large number of reachability notifications in the AMF for the UE.

Thus, it can be seen that if a plurality of NFc (e.g. thousands of NFc) ask for this kind of muting at the NFp with varying criteria for the same or different UEs, increasing the resource at the NFp side, i.e. adding storage (memory), may not be sufficient to solve the problem. Thus, it is inevitable that at some point of time, if a NFp cannot honour the subscription instruction received in a subscription request, the NFp has to break the mute instruction and drop data.

Currently, for example in 3GPP based networks, the event muting mechanism applies to functions and entities like AMF, SMF, UDM, AF NFs. However, it is conceivable that the mechanism is used in other NF types. The only control currently provided to manage storage space for buffered event notifications is that the number of stored events may be limited based on NF configuration. When this number is reached, the NF continues to store new events and deletes the oldest events, which means the old events are lost from the perspective of the NFc.

In the following, different exemplifying embodiments will be described for illustrating a processing for improving a mute notification mechanism between a data consumer and a data provider. For this, as an example of a communication network to which examples of embodiments may be applied, a communication network architecture based on 3GPP standards for a communication network, such as 5G/NR, is used, without restricting the embodiments to such an architecture, however. It is obvious for a person skilled in the art that the embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication networks as well.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet, as well as with individual devices or groups of devices being not considered as a part of a network, such as monitoring devices like cameras, sensors, arrays of sensors, and the like. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element or network functions, such as a NFc or a NFp, or other network elements or network functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to examples of embodiments, the instruction for notification muting is combined with an indication that indicates to the NFp what is a desired behavior when an exception condition occurs at the NFp (such as, for example, the buffer capacity is exhausted or will be exhausted in the near future, e.g. when a certain percentage is occupied). Basically, the indication contains information about actions on buffered notifications (for example, actions concern measures like 'Send All (or specified/predetermined data)' or 'Discard All (or specified/predetermined data)'), and information about actions on subscription (for example, measures like "close", "continue with muting", "continue without muting" of the respective subscription).

As one example, the indication regarding exception condition behavior is directly provided with the mute notification indication. As another additional example, the indication indicates to (re-)negotiate which action is to be executed, upon the occurrence of the exception condition.

It is to be noted that basically the above described mechanism is applicable on a per subscription basis or for a group of subscriptions (all or a subset of subscriptions created by the NFc at the NFp).

Furthermore, according to examples of embodiments, prioritization indications can be considered. For example, the data consumer can assign a priority level to the subscription or to events. The NFp takes this prioritization into account for a decision regarding actions to be conducted when exception conditions occur at the NFp. For example, this can be performed upon creating the subscription.

Figure 2:
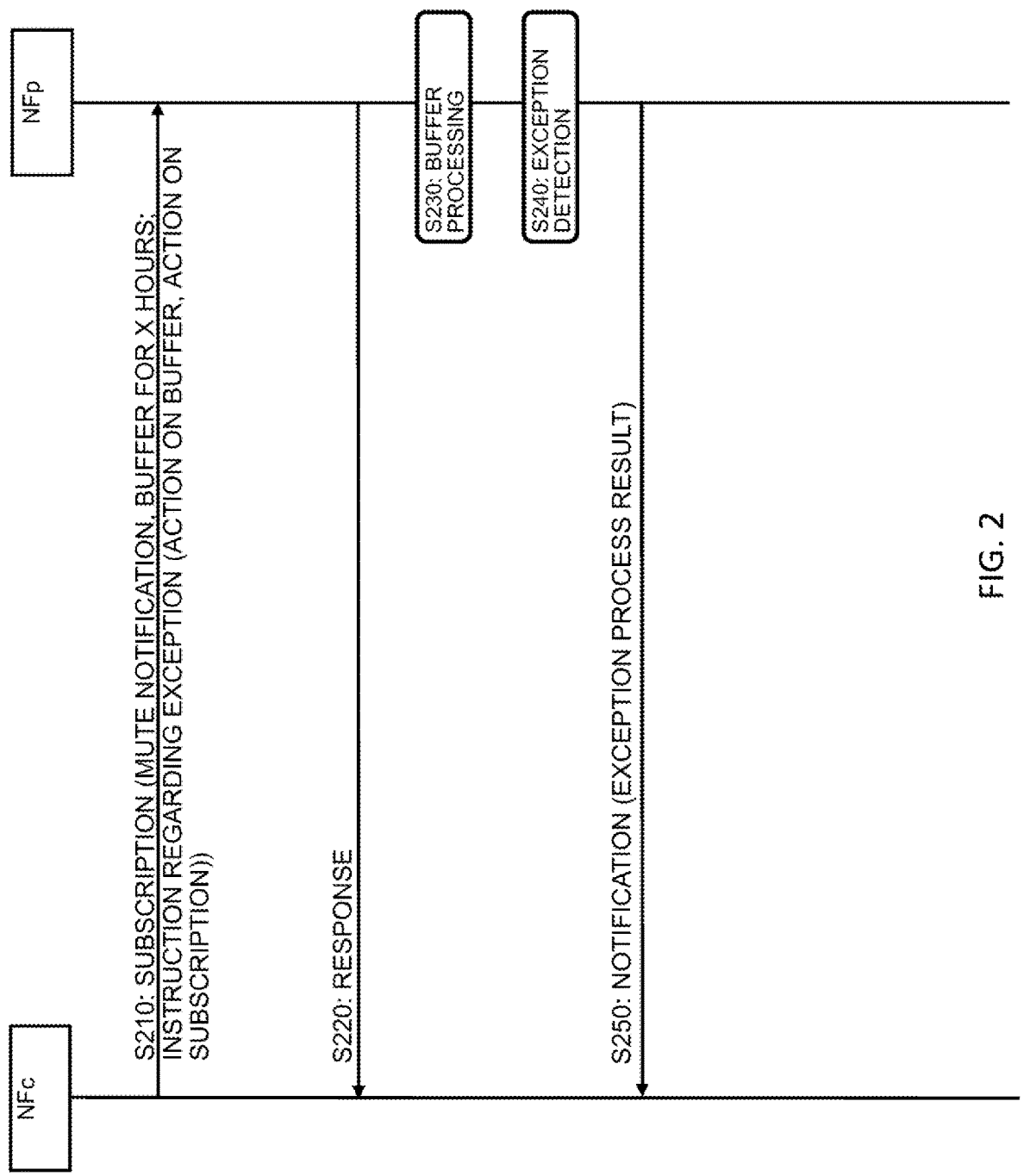
FIG. 2 shows a signaling diagram illustrating an example of a procedure conducted in a mute notification processing.
Figure 3:
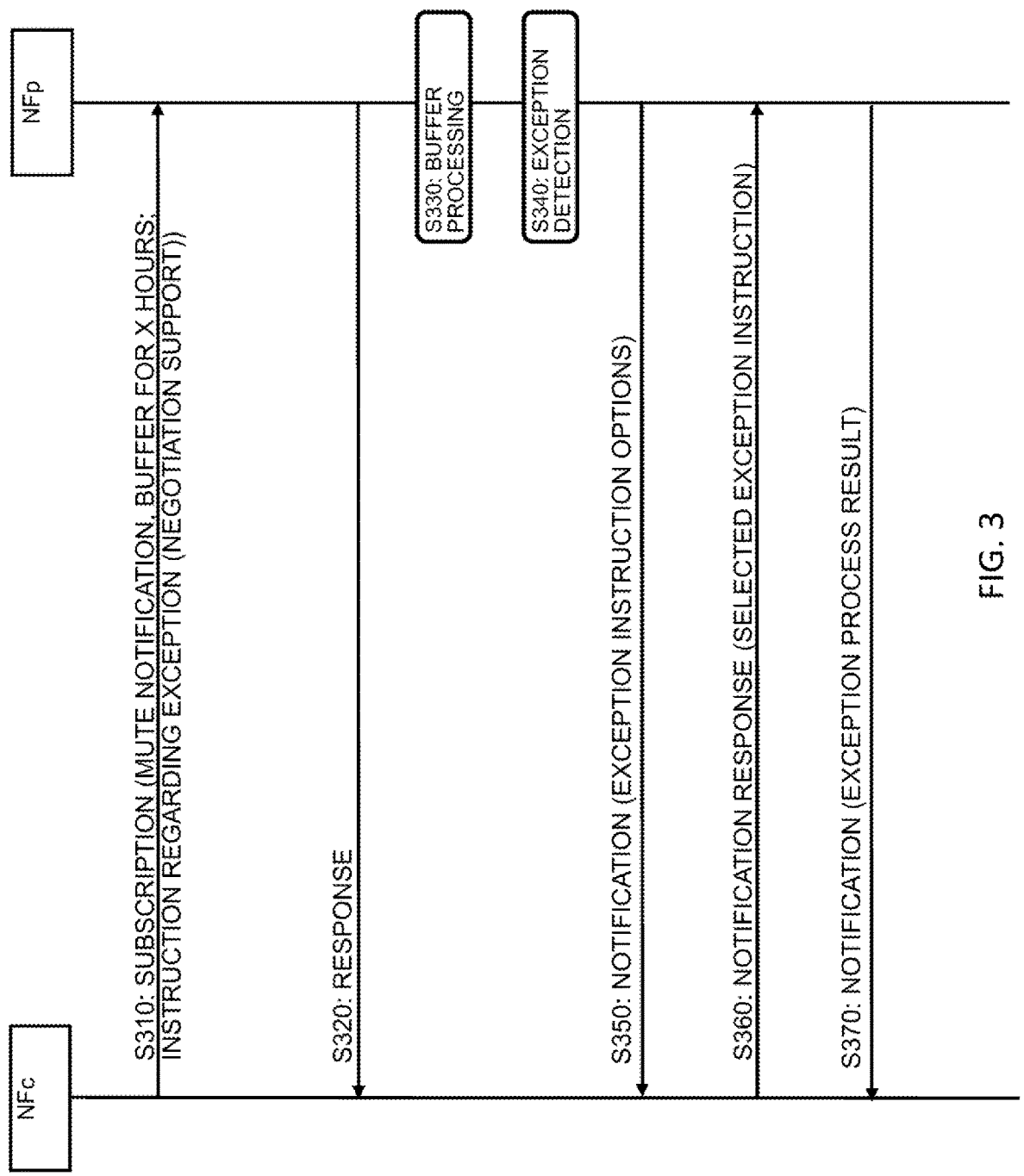
FIG. 3 shows a signaling diagram illustrating an example of a procedure conducted in a mute notification processing.
Figure 4:
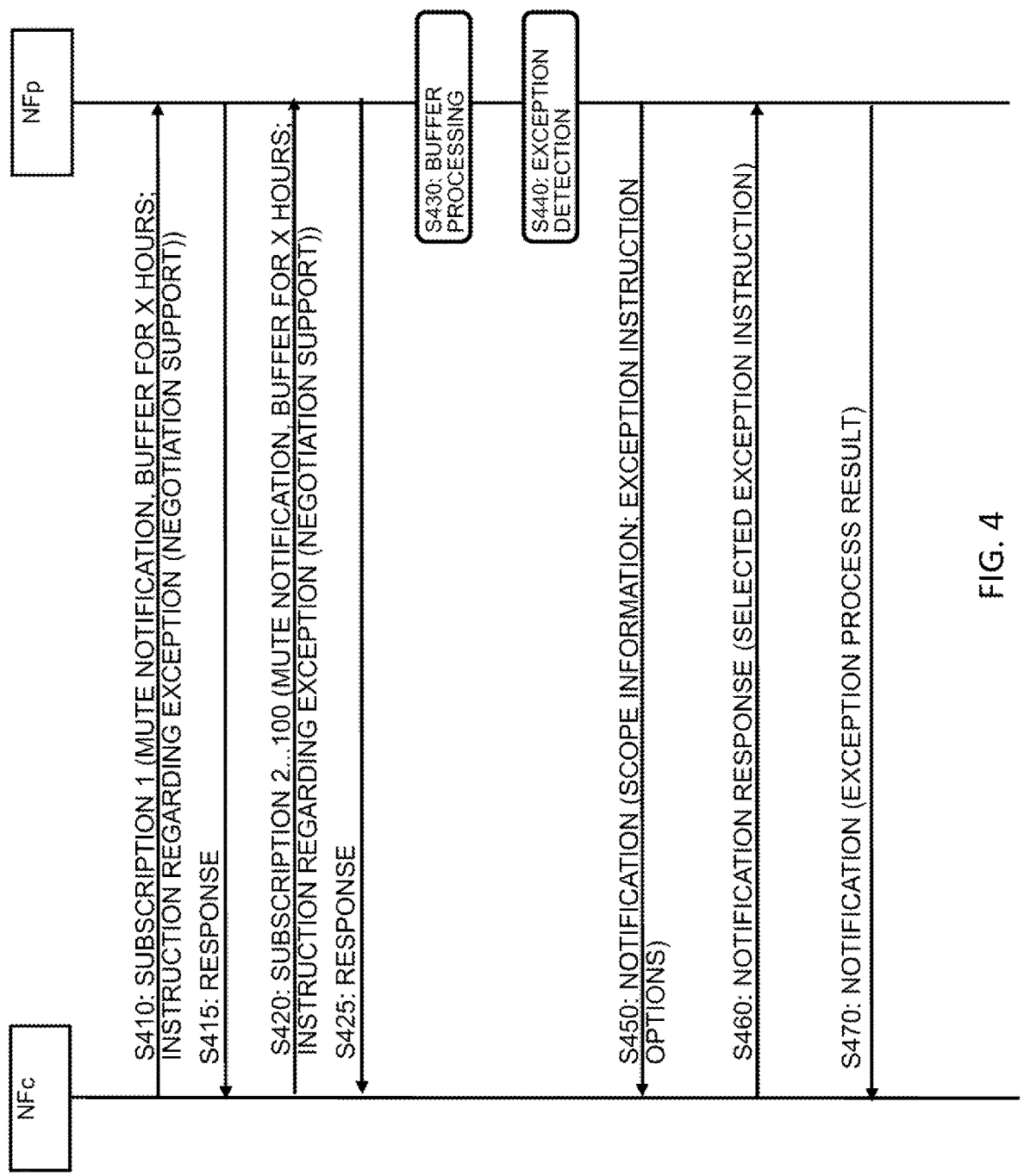
FIG. 4 shows a signaling diagram illustrating an example of a procedure conducted in a mute notification processing.

Next, with reference to FIGS. 2 to 4, which show signaling diagrams illustrating examples of a procedures conducted in a mute notification processing. Different options for improving the mute notification procedure according to examples of embodiments are described.

In FIG. 2, a first example is illustrated which refers to a solution where a NFc provides exception instructions on a per subscription basis upon subscription creation.

In S210, the NFc sends a subscription request to the NFp for a data collection service. The request comprises a mute notification indication. That is, the NFc wants to mute the notification regarding events (data) at the NFp until a predetermined stop condition is present. For example, transmission of notifications regarding events (i.e. data) is to be suspended for a preset time (e.g. X hours) or until a preset threshold is reached (e.g. a specified number of events, a frequency of occurrence of events, or the like). That is, according to the present example, the NFc provides besides the mute instruction also an exception instruction to the NFp. It is to be noted that in the present example a subscription request is used, but the same principle is also applicable when S210 concerns an update request.

The exception instruction informs the NFp to take certain actions when an exception occurs. According to examples of embodiments, the exception instructions can be realized by actions on buffered notifications, which comprises e.g. that the NFp either sends all notifications (buffered data) when an exception occurs (referred to 'Send All'), or that the NFp discards all notifications when an exception occurs (referred to as 'Discard All'). It is to be noted that the data to be transmitted or discarded may be also specified or preset to only a certain number or a part of the buffered data. Furthermore, the exception instructions can be realized by actions on subscription, which comprises e.g. to 'close' the subscription (the NFp terminates the subscription), to 'continue with buffering' (i.e. with muting) (the subscription is kept in the NFp, including muting of notifications), or to 'continue without muting' (the subscription is kept in the NFp, but muting is stopped, that is the NFp will send notifications when events occur at the NFp).

It is to be noted that according to examples of embodiment, a NFc can send either one of the options or multiple options to the NFp for the subscription.

In S220, after receiving the subscription request, the NFp responds to the subscription request. For example, the instructions regarding notification muting and exception instructions can be acknowledged/accepted. Alternatively, NFp makes an estimation of its available memory and notifies the NFc in the response with updated mute instruction. For example, the NFp can provide buffering for example for only Y hours instead of the requested X hours. In this case, an updated stop condition indication is provided to the NFc so as to inform it about the changed condition (e.g. a shorter time or changed threshold, such as that less events are considered). As another alternative, the NFp sends to the NFc either the indication related to the estimated buffer capacity or an updated stop condition indication (that is, without the estimated buffer capacity indication).

In S230, the NFp conducts the data collection and the buffer processing, as requested or indicated.

In S240, the NFp detects that an exception condition occurs. Basically, an exception conditions occurring at the NFp means that the NFp is not able to process the mute instruction (i.e. it impairs the mute notification processing, for example due to lack of buffer capacity, or another situation which makes a further buffering impossible). In case the occurrence of the exception condition is detected, the NFp executes the exception instruction provided by the NFc by the indication.

It is to be noted that in case the NFc has provided the multiple exception instructions in the indication, then NFp is configured to select that option which is the most suitable. The selection is based, for example, on the NFp's logic or on an operator configuration.

In S250, the NFp conducts the corresponding processing according to the exception instruction. For example, as illustrated in FIG. 2, the NFp sends the notifications (buffer records) to the NFc. Alternatively, the NFp can discard all data, depending on the exception instruction in the subscription request. Moreover, the NFp conducts an action on the subscription, such as closing the subscription implicitly if requested by the NFc in the exception instruction.

The possibilities for the combinations of actions for a subscription are illustrated in the following table 1.

| | | Action on subscription | | |
|---|---|---|---|---|
| | | close | continue with buffering | continue without muting |
| Action buffered notifications | Send all | Send all Notifications immediately and close the Subscriptions implicitly | Send all Notifications immediately but continue the Subscription and notification buffering | Send all Notifications immediately and continue the Subscription without notification buffering |
| | Discard all | Discard all the buffered notifications and close the subscription and inform accordingly | Discard all the buffered notifications and inform about it, then restart the buffering | Discard all the buffered notifications and continue the subscription without notification buffering |

In other words, the instruction combinations regarding the exception can be summarized as follows.
Option 1: Send all notifications immediately and close the Subscriptions implicitly.
Option 2: Send all notifications immediately but continue the subscription and notification buffering.
Option 3: Send all notifications immediately and continue the subscription without notification buffering
Option 4: Discard all the buffered notifications and close the subscription and inform the consumer
Option 5: Discard all the buffered notifications and inform the consumer about the same, then restart the buffering
Option 6: Discard all the buffered notifications and continue the subscription without notification buffering.

It is to be noted that, while the above indicated instructions in table 1 refer to sending or discarding all notifications, it is also conceivable that the "send" or "discard" instruction is related only to a predetermined subset of the buffered data, such as the first half of the buffered data, or data being specified in another manner.

In FIG. 3, a second example is illustrated which refers to a solution where the NFp and the NFc negotiate the exception instruction on a per subscription basis upon exception occurrence.

In S310, the NFc sends a subscription request to the NFp for a data collection service. The request comprises a mute notification indication. That is, the NFc wants to mute the notification regarding events (data) at the NFp until a predetermined stop condition is present. For example, transmission of notifications regarding events (i.e. data) is to be suspended for a preset time (e.g. X hours) or until a preset threshold is reached (e.g. a specified number of events, a frequency of occurrence of events, or the like). That is, according to the present example, the NFc provides besides the mute instruction also an exception instruction to the NFp in the form of an indication that negotiation is supported (for example, a flag regarding SupportingNegotiation=True). It is to be noted that in the present example a subscription request is used, but the same principle is also applicable when S310 concerns an update request.

In S320, after receiving the subscription request, the NFp responds to the subscription request. For example, the instructions regarding notification muting and exception instructions can be acknowledged/accepted.

In S330, the NFp conducts the data collection and the buffer processing, as requested.

In S340, the NFp detects that an exception condition occurs. As described above, an exception condition occurring at the NFp means that the NFp is not able to process the mute instruction (i.e. it impairs the mute notification processing, for example due to lack of buffer capacity, or another situation which makes a further buffering impossible). In case the occurrence of the exception condition is detected, the NFp executes the exception instruction provided by the NFc, i.e. it starts negotiating the actions to be conducted.

That is, in the present example, the NFp shall not decide by its own on the mute instructions, i.e. which action is to be executed. Rather the NFp sends in S350 a notification to the NFc with the indication of the exception condition and options of exception instructions. For example, the NFp can provide one or more options of the above described options 1 to 6 described in connection with table 1 to the NFc so that NFc can select a suitable instruction.

According to examples of embodiments, depending on the exception condition, the NFp can also send the notification at a different stage and provide a set of possible exception instruction to NFc to choose from. For example, the exception condition is a remaining buffer capacity. When, for example, the buffer is 70% full, the NFp can include as one option for the exception instruction an option like "send all but continue the subscription and notification buffering". However, when the remaining capacity is decreasing, e.g. when the buffer is 90% full, the option part "continue buffering" is no longer presented.

In S360, after the NFc has selected an option for the exception instruction (that is, the NFc can choose the exception instruction from the provided list of the exception instructions), it provides a notification response to the NFp for informing about the selection.

In S370, the NFp conducts the corresponding processing according to the selected and indicated exception instruction. For example, the NFp sends the notifications (buffer records) to the NFc. Furthermore, the NFp conducts an action on the subscription, such as closing the subscription implicitly.

In FIG. 4, a third example is illustrated which refers to a solution where the NFp and the NFc negotiate the exception instruction for multiple subscriptions upon exception occurrence.

In S410 and S420, the NFc sends a plurality of subscription requests (e.g. subscriptions 1 to 100, for the sake of simplicity only two are illustrated) to the NFp for a data collection services. The requests comprises a mute notification indication. That is, the NFc wants to mute the notification regarding events (data) at the NFp until a predetermined stop condition is present. For example, transmission of notifications regarding events (i.e. data) is to be suspended for a preset time (e.g. X hours but it is to be noted that the time values may vary between the individual subscriptions) or until a preset threshold is reached (e.g. a specified number of events, a frequency of occurrence of events, or the like, but it is to be noted that the thresholds may vary between the individual subscriptions).

According to the present example, the NFc provides besides the mute instruction also an exception instruction to the NFp in the form of an indication that negotiation is supported (for example, a flag regarding Supporting Negotiation=True).

It is to be noted that in the present example a subscription request is used, but the same principle is also applicable when S410, S420 concerns an update request.

In S415 and S425, after receiving the subscription requests, the NFp responds to the subscription requests. For example, the instructions regarding notification muting and exception instructions can be acknowledged/accepted.

In S430, the NFp conducts data collections and the buffer processing, as requested.

In S440, the NFp detects that an exception condition occurs for one or more of the subscriptions. As described above, an exception conditions occurring at the NFp means that the NFp is not able to process the mute instruction (i.e. it impairs the mute notification processing, for example lack of buffer capacity, or another situation which makes a further buffering impossible). In case the occurrence of the exception condition is detected, the NFp executes the exception instruction provided by the NFc, i.e. it starts negotiating the actions to be conducted.

That is, in the present example, the NFp shall not decide by its own on the mute instructions, i.e. which action is to be executed. Rather the NFp sends in S450 a notification to the NFc with the indication of the exception condition and options of exception instructions. For example, the NFp can provide one or more options of the above described options 1 to 6 described in connection with table 1 to the NFc, and a scope indication. The scope indication identifies the scope of the exception instructions. For example, scope indication is on a per NFc basis (i.e. applicable to all the subscriptions created by the NFc at the NFp), related to a group of subscriptions (i.e. applicable to all the subscriptions indicated in a list of subscription IDs), or related to an individual subscription (this is similar to the case described in connection with FIG. 3).

It is to be noted that according to examples of embodiments, depending on the exception condition, the NFp can also send the list and scope indication at a different stage and provide a set of possible exception instruction to NFc to choose from. For example, the exception condition is a remaining buffer capacity. When, for example, the buffer is 70% full, the NFp can include as one option for the exception instruction an option like "send all but continue the subscription and notification buffering". However, when the remaining capacity is decreasing, e.g. when the buffer is 90% full, the option part "continue buffering" is no longer presented.

According to further examples of embodiments, in S450, the NFp may also send an indication related to a maximum number of subscriptions allowed to be prioritized. For example, assuming the NFc has created 100 subscriptions towards the NFp all with different buffering requirements. When the NFp buffer is full, the NFp may send a single instruction to the data consumer for all the subscriptions (i.e. scope indication is: NFc). Alternatively, the NFp may send a scope indication related to a sub-group of subscriptions, such as a subscription ID list indicating subscriptions 1, 2, 3, 4 . . . 50. In this case, the proposed (and then selected) exception instruction will be applicable to these subscription IDs only.

In S460, based on the scope indication, the NFc can select the exception instruction applicable to the subscriptions (for example to all or a sub-set of the subscriptions created by the NFc at the NFp). Then, the NFc provides a notification response to the NFp for informing about the selection.

According to some examples of embodiments, the NFc can also send in S460 a PrioritizedSubscriptionIdList along with selected exception instruction. This information is used by the NFp to prioritize the subscription IDs. That is, the NFp tries, if possible, to avoid applying any action (i.e. exception instruction) to subscription IDs contained in the PrioritizedSubscriptionIdList and to continue buffering (muted) events for them. It is to be noted that the PrioritizedSubscriptionIdList can depend on the indication provided by the NFp related to the maximum number of subscriptions allowed to be prioritized, i.e. it must not contain subscription IDs more than given in the indication related to the maximum number of subscriptions.

According to further examples of embodiments, it is also possible that, as an alternative to the PrioritizedSubscriptionIdList, the NFc informs the NFp to prioritize certain subscriptions related to events/services. For example, a PrioritizedEventList or PrioritizedNFpServiceList can be provided to the NFp, e.g. in S410, S420 or in S460.

According to further examples of embodiments, the NFc is also able to attach the preferable exception instruction (i.e. the selected actions to be conducted) per PrioritizedSubscriptionList/PrioritizedEventList/PrioritizedNFpServiceList. In this way, a consumer is able to group the subscriptions per preferable exception instruction.

In S470, the NFp conducts the corresponding processing according to the selected and indicated exception instruction.

Figure 5:
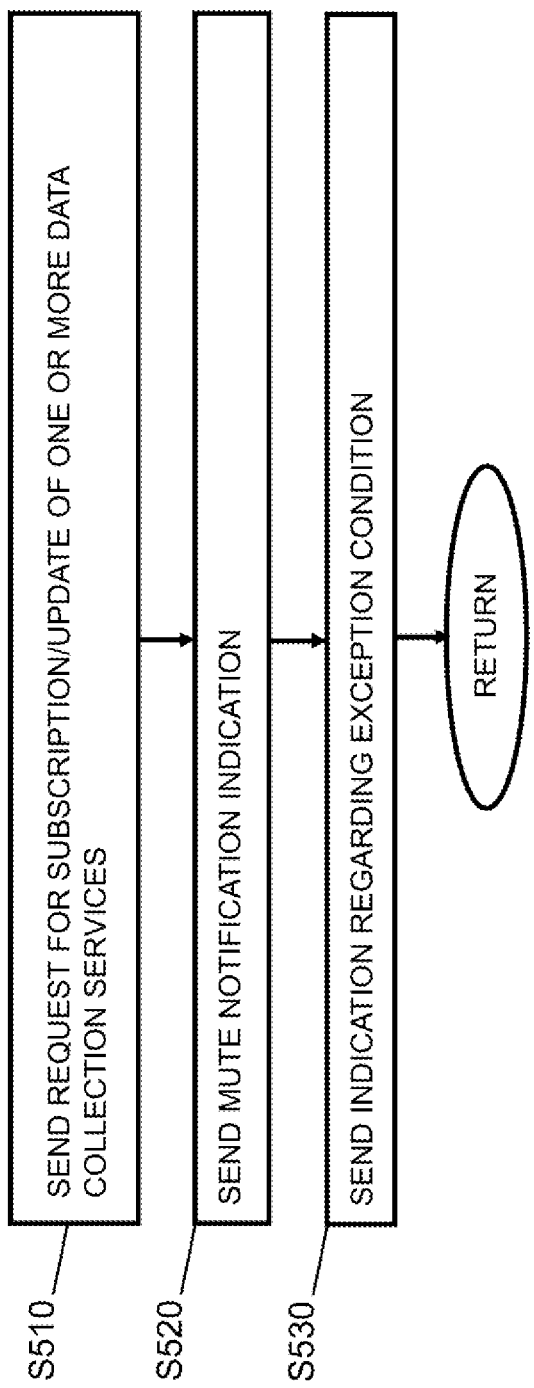
FIG. 5 shows a flow chart of a processing conducted in a network element or network function being a data consumer according to some examples of embodiments.

FIG. 5 shows a flow chart of a processing executed by a network element or network function configured to operate as a data consumer. That is, FIG. 5 shows a flowchart related to a processing conducted by a NFc as also described in connection with FIGS. 2 to 4. It is to be noted that the communication network element or communication network function configured to operate as the data consumer is one of a data collection coordination function (DCCF), a network data analytics function (NWDAF), a core network management function and a core network control function (e.g. AMF, SMF etc.) of a communication network.

In S510, the NFc sends, to a network entity acting as a data provider, at least one request to subscribe to or modify at least one data collection service. That is, the data consumer can have subscriptions for one or more data collection services at the same data provider.

In S520, when sending the request, also a mute notification indication is sent to the data provider. The mute notification indication indicates that data collected by the at least one data collection service are to be buffered and that a transmission to the data consumer is to be suspended until a predetermined stop condition is satisfied. The stop condition comprising at least one of a time indication (e.g. a time period or a point of time until when the buffering shall be performed, and/or a threshold, such as an indication of a number of events to be considered, or the like).

In S530, in addition to the mute notification indication, an indication is sent regarding a procedure to be conducted by the data provider when an exception condition impairing buffering of the collected data is detected during at least one data collection service.

According to examples of embodiments, the exception condition impairing buffering of the collected data comprises at least one of detecting that a buffering capacity for collected data becomes equal to or lower than a preset value, detecting that the buffering capacity for collected data is exhausted, and/or detecting that detecting at least one exceptional condition causing that further buffering is not possible at the data provider. In other words, the exception condition is e.g. that the memory used for buffering, or a space reserved for buffering, is full or approaches to the full state, such as that a preset part thereof is full, like 70% or the like.

Furthermore, according to examples of embodiments, the indication of the procedure to be conducted by the data provider comprises one or more of the following: at least one indication that affects an action to be executed on buffered data of at least one data collection service (that is, one or more indications regarding a way how to handle the collected data can be given for each subscription, wherein a plurality of subscriptions can be covered by separate indications), at least one indication that affects an action to be executed on a subscription of at least one data collection service (that is, one or more indications how to handle the subscription can be given for each subscription, wherein a plurality of subscriptions can be covered by separate indications), and an instruction to negotiate an action to be executed on buffered data of at least one data collection service and an action to be executed on a subscription of at least one data collection service (that is, the data provider is instructed to contact the data consumer, for example in case of the exception condition so as to negotiate how to proceed with the buffered data and/or the subscription).

For example, according to examples of embodiments, the action to be executed on buffered data of at least one data collection service comprises one of the following: transmitting some or all buffered data to the data consumer when the exception condition impairing buffering of the collected data is detected, or discarding some or all buffered data when the exception condition impairing buffering of the collected data is detected (the respective action can be set for one or more subscriptions). On the other hand, the action to be executed on the subscription of at least one data collection service comprises one of terminating the subscription of the at least one data collection service, continuing the at least one data collection service of the subscription and the buffering of the collected data, and continuing the at least one data collection service of the subscription but stopping the buffering of the collected data (the respective action can be set for one or more subscriptions).

According to further examples of embodiments, the NFc receives from the data provider a response to the at least one request to subscribe to or modify at least one data collection service, and processes the response. The response comprises at least one of an indication related to an estimated available buffer capacity, and information related to a changed stop condition being different from the stop condition included in the at least one request to subscribe to or modify at least one data collection service (for example, a time indication being different to the time in the request after which the buffered data are transmitted). In other words, the data provider informs the data consumer that the available buffer capacity for the mute processing (i.e. the buffering of the collected data before transmitting it to the consumer) is different to the requested capacity, for example with regard to amount of space or availability in time, or the like.

According to further examples of embodiments, when the indication of the procedure to be conducted by the data provider comprises an instruction to negotiate the action to be executed on buffered data of at least one data collection service and the action to be executed on a subscription of at least one data collection service, the NFc can receive, from the data provider, a notification that an exception condition is detected. The notification includes at least one option for the action to be executed on buffered data of at least one data collection service and the action to be executed on a subscription of at least one data collection service to be selected by the data consumer (for example, the data provider can determine whether all or only a subset of possible actions is offered to the data consumer, e.g. depending on the current situation or the type of data or the type of data consumer). Then, the NFc select, from the at least one option, the action to be executed on buffered data of at least one data collection service and the action to be executed on a subscription of at least one data collection service. It is to be noted that also more than one action type may be selected, if presented by the data provider. After that, the NFc transmits a response to the notification to the data provider, wherein the response indicates the selected action to be executed on buffered data of at least one data collection service and the action to be executed on a subscription of at least one data collection service.

Furthermore, when a plurality of data collection services are subscribed by the NFc, the NFc can receive from the data provider, in connection with the notification that an exception condition is detected, a scope indication defining at least one of the plurality of data collection services for which the exception condition is detected (that is, the scope indication informs which subscription is concerned, e.g. all subscription, a subset of subscriptions or individual subscription). In this case, the action to be executed on buffered data of at least one data collection service and the action to be executed on a subscription of at least one data collection service is selected for the at least one of the plurality of data collection services indicated by the scope indication.

In addition, the NFc prepares a prioritization information indicating a priority level for at least one data collection service being subscribed. The priority level indicates an allowability level for actions to be executed for the at least one data collection service when an exception condition is detected. That is, the priority level informs, for example, that for the subscriptions with the highest priority level no action shall be considered, if possible, or that actions shall be considered not before actions are considered for the other subscriptions. Then, the NFc informs the data provider about the prioritization information.

Figure 6:
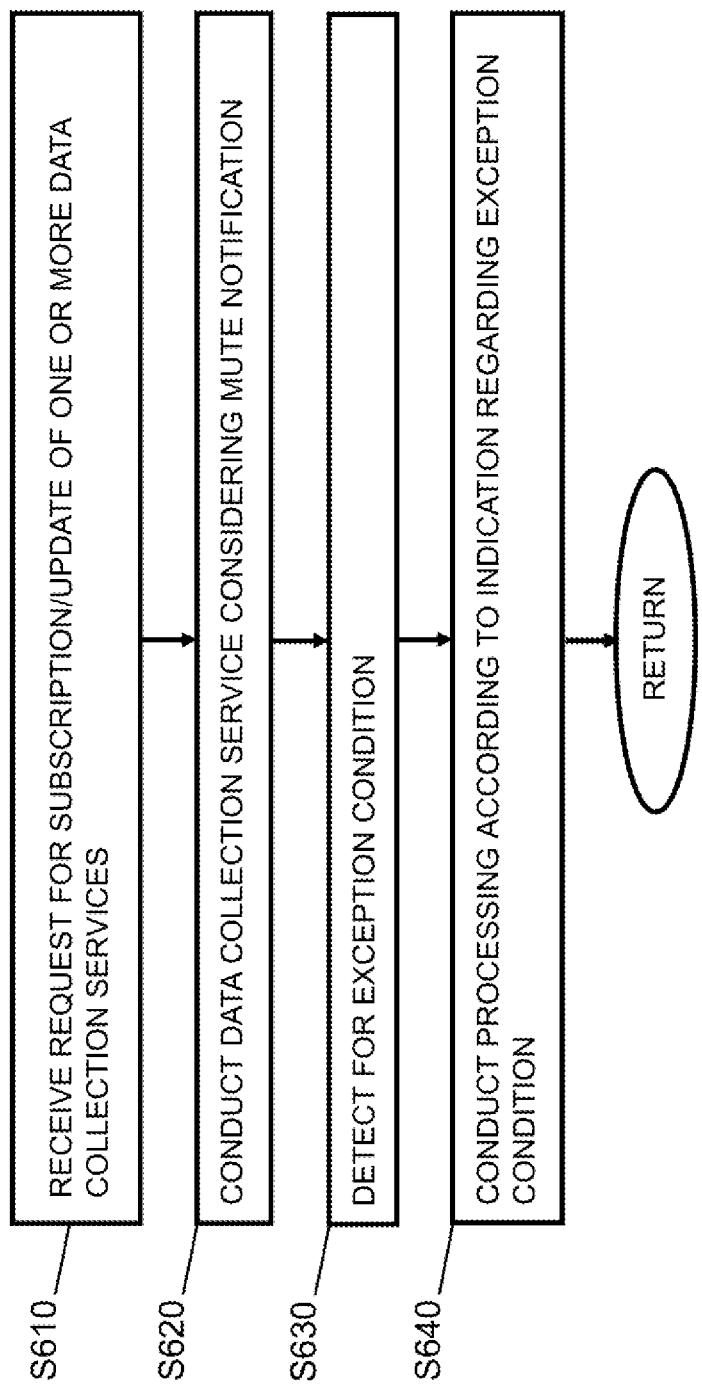
FIG. 6 shows a flow chart of a processing conducted in a network element or network function being a data provider according to some examples of embodiments.

FIG. 6 shows a flow chart of a processing executed by a network element or network function configured to operate as a data provider. That is, FIG. 6 shows a flowchart related to a processing conducted by a NFp as also described in connection with FIGS. 2 to 4.

In S610, the NFp receives, from a network entity acting as a data consumer, at least one request to subscribe to or modify at least one data collection service. That is, the data provider may have subscriptions for one or more data collection services for the same data consumer. The received request comprises also a mute notification indication. The mute notification indication indicates that data collected by the at least one data collection service are to be buffered and that a transmission to the data consumer is to be suspended until a predetermined stop condition is satisfied. The stop condition comprising at least one of a time indication (e.g. a time period or a point of time until when the buffering shall be performed, and/or a threshold, such as an indication of a number of events to be considered, or the like). In addition to the mute notification indication, an indication is received regarding a procedure to be conducted by the data provider when an exception condition impairing buffering of the collected data is detected during at least one data collection service.

According to examples of embodiments, the data consumer is one of a data collection coordination function (DCCF), a network data analytics function (NWDAF), a core network management function and a core network control function (e.g. AMF, SMF etc.) of a communication network.

In S620, the NFp conducts the at least one data collection service and buffers the collected data according to the mute notification indication.

In S630, the NFp detects whether an exception condition occurs for at least one data collection service.

According to examples of embodiments, the exception condition impairing buffering of the collected data comprises at least one of detecting that a buffering capacity for collected data becomes equal to or lower than a preset value, detecting that the buffering capacity for collected data is exhausted, and/or detecting at least one exceptional condition causing that further buffering is not possible at the data provider. In other words, the exception condition is e.g. that the memory used for buffering, or a space reserved for buffering, is full or approaches to the full state, such as that a preset part thereof is full, like 70% or the like.

In S640, when the exception condition is detected, the NFp conducts a processing according to the indication of the procedure to be conducted by the data provider.

According to examples of embodiments, the indication of the procedure to be conducted by the data provider comprises one or more of the following: at least one indication that affects an action to be executed on buffered data of at least one data collection service (that is, one or more indications regarding a way how to handle the collected data can be received for each subscription, wherein a plurality of subscriptions can be covered by separate indications), at least one indication that affects an action to be executed on a subscription of at least one data collection service (that is, one or more indications how to handle the subscription can be received for each subscription, wherein a plurality of subscriptions can be covered by separate indications), and an instruction to negotiate an action to be executed on buffered data of at least one data collection service and an action to be executed on a subscription of at least one data collection service (that is, the data provider is instructed to contact the data consumer, for example in case of the exception condition so as to negotiate how to proceed with the buffered data and/or the subscription).

For example, according to examples of embodiments, the action to be executed on buffered data of at least one data collection service comprises one of the following: transmitting some or all buffered data to the data consumer when the exception condition impairing buffering of the collected data is detected, or discarding some or all buffered data when the exception condition impairing buffering of the collected data is detected (the respective action can be set for one or more subscriptions). On the other hand, the action to be executed on the subscription of at least one data collection service comprises one of terminating the subscription of the at least one data collection service, continuing the at least one data collection service of the subscription and the buffering of the collected data, and continuing the at least one data collection service of the subscription but stopping the buffering of the collected data (the respective action can be set for one or more subscriptions).

Furthermore, according to examples of embodiments, the NFp processes the mute notification indication, wherein it is determined whether a sufficient buffer capacity is available for the preset time. In case the buffer capacity available for the preset time is not sufficient, the NFp sends, to the data consumer, a response to the at least one request to subscribe to or modify at least one data collection service, wherein the response comprises at least one of an indication related to an estimated available buffer capacity and information related to a changed stop condition being different from the stop condition included in the at least one request to subscribe to or modify at least one data collection service (for example, a time indication being different to the time in the request after which the buffered data are transmitted). In other words, the data provider informs the data consumer that the available buffer capacity for the mute processing (i.e. the buffering of the collected data before transmitting it to the consumer) is different to the requested capacity, for example with regard to amount of space or availability in time, or the like.

According to further examples of embodiments, when the indication of the procedure to be conducted by the data provider comprises at least one indication concerning an action to be executed on buffered data of at least one data collection service and at least one indication concerning an action to be executed on a subscription of at least one data collection service, the NFp select at least one of the actions indicated in the indications and executes the selected at least one action.

On the other hand, according to examples of embodiments, when the indication of the procedure to be conducted by the data provider comprises an instruction to negotiate the action to be executed on buffered data of at least one data collection service and the action to be executed on a subscription of at least one data collection service, when the exception condition occurs, the NFp sends a notification to the data consumer indicating that the exception condition is detected. The notification includes at least one option for the action to be executed on buffered data of at least one data collection service and the action to be executed on a subscription of at least one data collection service to be selected by the data consumer (for example, the data provider can determine whether all or only a subset of possible actions is offered to the data consumer, e.g. depending on the current situation or the type of data or the type of data consumer). Then, the NFp receives from the data consumer a response to the notification, wherein the response indicates a selected action to be executed on buffered data of at least one data collection service and the action to be executed on a subscription of at least one data collection service. Then, the NFp executes the selected actions.

Furthermore, when a plurality of data collection services are subscribed for one data consumer (i.e. one NFc, wherein more than one NFc may have a plurality of subscriptions each), the NFp determines a scope indication defining at least one of the plurality of data collection services for which the exception condition is detected (that is, the scope indication indicates which subscription is concerned, e.g. all subscription, a subset of subscriptions or individual subscription). The NFp transmits the scope indication to the data consumer together with the notification that an exception condition is detected. The action to be executed on buffered data of at least one data collection service and the action to be executed on a subscription of at least one data collection service is executed for the at least one of the plurality of data collection services indicated by the scope indication.

According to further examples of embodiments, the NFp obtains prioritization information indicating a priority level for at least one data collection service being subscribed. The priority level indicates an allowability level for actions to be executed for the at least one data collection service when an exception condition is detected. That is, the priority level informs, for example, that for the subscriptions with the highest priority level no action shall be considered, if possible, or that actions shall be considered not before actions are considered for the other subscriptions. Then, the NFp executes actions on subscribed data collection services considering the prioritization information.

Figure 7:
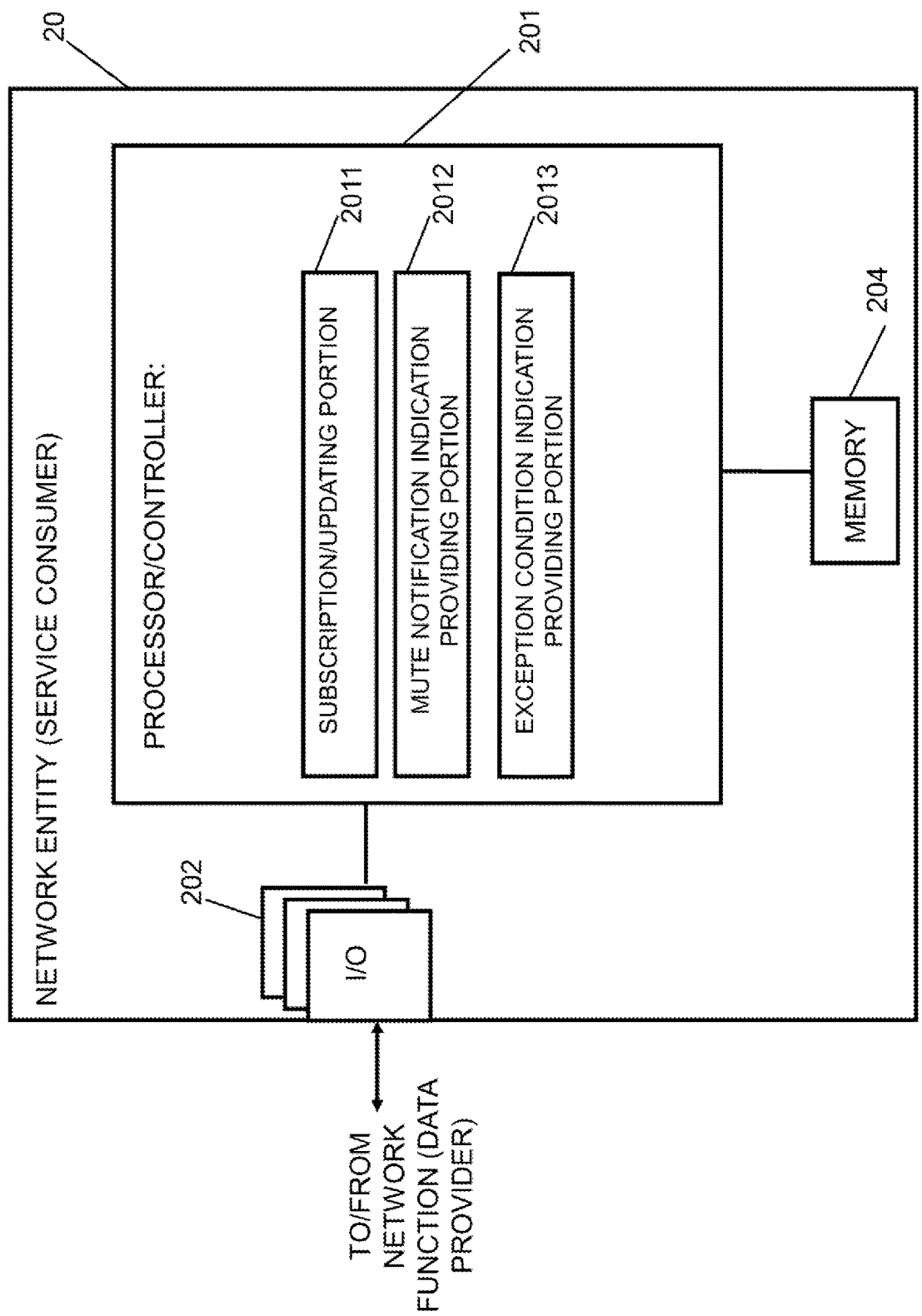
FIG. 7 shows a diagram of a network element or network function acting as a data consumer according to some examples of embodiments.

FIG. 7 shows a diagram of a network element or network function configured to act as a data consumer (i.e. NFc) 20 according to some examples of embodiments, as described in connection with FIGS. 2 to 4, which is configured to conduct a processing according to examples of embodiments of the disclosure. It is to be noted that the network element or function such as the NFc 20 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The NFc 20 shown in FIG. 7 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 denotes input/output (I/O) units or functions (interfaces) connected to the processor or processing function 201. The I/O units 202 may be used for communicating with network functions such as data providers, as shown in FIG. 1. The I/O units 202 may be combined units including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described analytics procedure. In particular, the processor or processing circuitry or function 201 includes one or more of the following sub-portions. Sub-portion 2011 is a processing portion which is usable as a portion for requesting subscription or updating. The portion 2011 may be configured to perform processing according to S510 of FIG. 5. Furthermore, the processor or processing circuitry or function 201 may include a sub-portion 2012 usable as a portion providing a mute notification indication. The portion 2012 may be configured to perform a processing according to S520 of FIG. 5. In addition, the processor or processing circuitry or function 201 may include a sub-portion 2013 usable as a portion for providing an indication regarding an exception condition. The portion 2013 may be configured to perform a processing according to S530 of FIG. 5.

Figure 8:
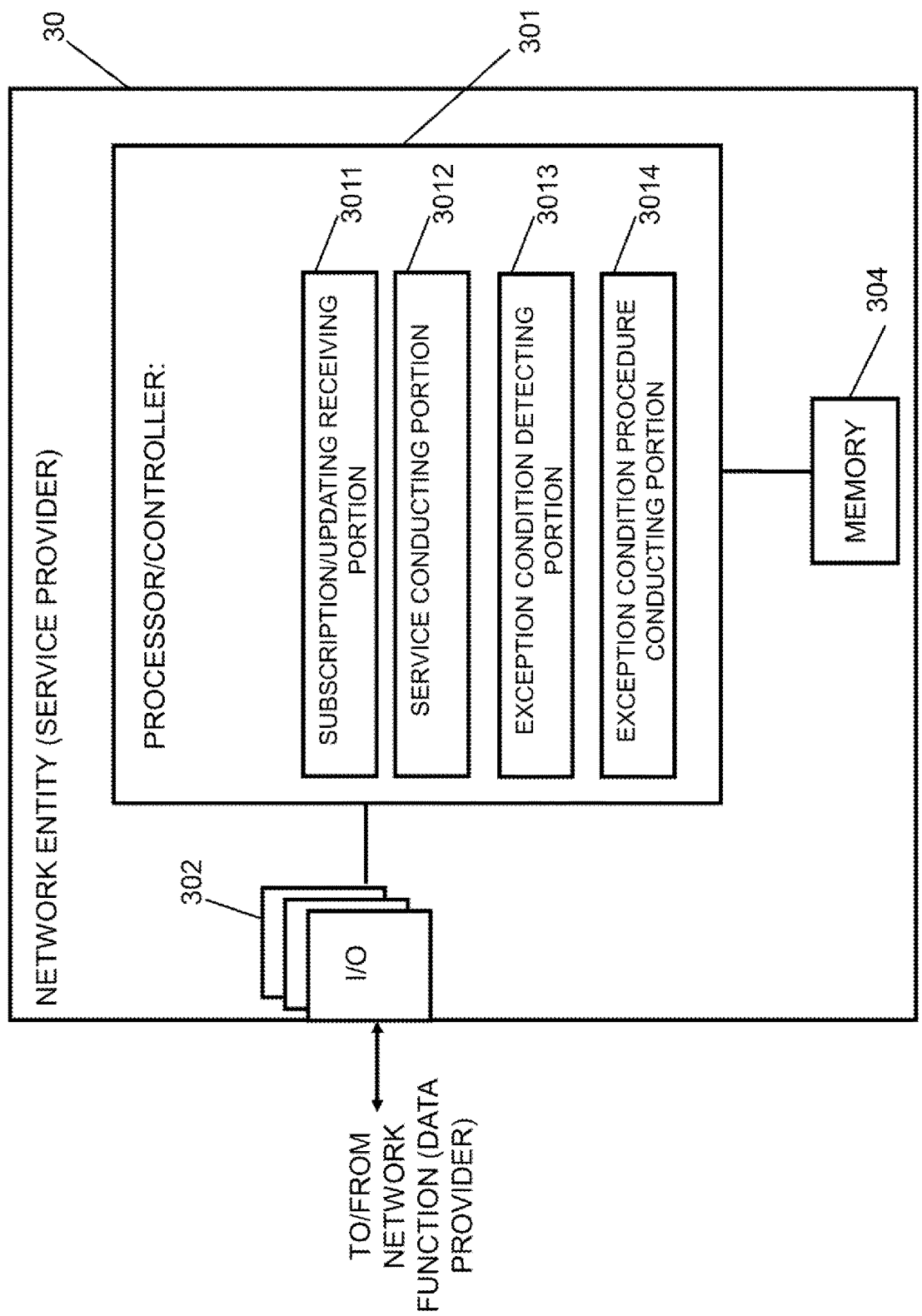
FIG. 8 shows a diagram of a network element or network function acting as a data provider according to some examples of embodiments.

FIG. 8 shows a diagram of a network element or network function configured to act as a data provider (i.e. NFp) 30 according to some examples of embodiments, as described in connection with FIGS. 2 to 4, which is configured to conduct a processing according to examples of embodiments of the disclosure. It is to be noted that the network element or function such as the NFp 30 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The NFp 30 shown in FIG. 8 may include a processing circuitry, a processing function, a control unit or a processor 301, such as a CPU or the like, which is suitable for executing instructions given by programs or the like related to the control procedure. The processor 301 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 302 denotes input/output (I/O) units or functions (interfaces) connected to the processor or processing function 301. The I/O units 302 may be used for communicating with network functions such as data consumers, as shown in FIG. 1. The I/O units 302 may be combined units including communication equipment towards several entities, or may include a distributed structure with a plurality of different interfaces for different entities. Reference sign 304 denotes a memory usable, for example, for storing data and programs to be executed by the processor or processing function 301 and/or as a working storage of the processor or processing function 301. It is to be noted that the memory 304 may be implemented by using one or more memory portions of the same or different type of memory.

The processor or processing function 301 is configured to execute processing related to the above described analytics procedure. In particular, the processor or processing circuitry or function 301 includes one or more of the following sub-portions. Sub-portion 3011 is a processing portion which is usable as a portion for receiving a request for subscription or updating. The portion 3011 may be configured to perform processing according to S610 of FIG. 6. Furthermore, the processor or processing circuitry or function 301 may include a sub-portion 3012 usable as a portion for conducting a service. The portion 3012 may be configured to perform a processing according to S620 of FIG. 6. In addition, the processor or processing circuitry or function 301 may include a sub-portion 3013 usable as a portion for detecting an exception condition. The portion 3013 may be configured to perform a processing according to S630 of FIG. 6. Furthermore, the processor or processing circuitry or function 301 may include a sub-portion 3014 usable as a portion for conducting an exception condition procedure. The portion 3014 may be configured to perform a processing according to S640 of FIG. 6.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operation environment may be used in connection with examples of embodiments of the disclosure based on the principles defined.

According to a further example of embodiments, there is provided, for example, an apparatus for use by a communication network element or communication network function configured to operate as a data consumer, the apparatus comprising means configured to send, to a network entity acting as a data provider, at least one request to subscribe to or modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service.

Furthermore, according to some other examples of embodiments, the above defined apparatus may further comprise means for conducting at least one of the processing defined in the above described methods, for example a method according to that described in connection with FIG. 5.

According to a further example of embodiments, there is provided, for example, an apparatus for use by a communication network element or communication network function configured to operate as a data provider, the apparatus comprising means configured to receive, from a network entity acting as a data consumer, at least one request to subscribe to or to modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service, means configured to conduct the at least one data collection service and to buffer the collected data according to the mute notification indication, means configured to detect whether an exception condition occurs for at least one data collection service, and when the exception condition occurs, means configured to conduct a processing according to the indication of the procedure to be conducted by the data provider.

Furthermore, according to some other examples of embodiments, the above defined apparatus may further comprise means for conducting at least one of the processing defined in the above described methods, for example a method according to that described in connection with FIG. 6.

According to a further example of embodiments, there is provided, for example, a non-transitory computer readable medium comprising program instructions for causing an apparatus to perform, when used in a communication network element or communication network function configured to operate as a data consumer, a processing comprising sending, to a network entity acting as a data provider, at least one request to subscribe to or modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service.

According to a further example of embodiments, there is provided, for example, a non-transitory computer readable medium comprising program instructions for causing an apparatus to perform, when used in a communication network element or communication network function configured to operate as a data provider, a processing comprising receiving, from a network entity acting as a data consumer, at least one request to subscribe to or to modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service, conducting the at least one data collection service and to buffer the collected data according to the mute notification indication, detecting whether an exception condition occurs for at least one data collection service, and when the exception condition occurs, conducting a processing according to the indication of the procedure to be conducted by the data provider.

It should be appreciated that
an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus for use by a communication network element or communication network function configured to operate as a data consumer, the apparatus comprising:
   at least one processing circuitry, and
   at least one memory for storing instructions that, when executed by the at least one processing circuitry,
   cause the apparatus at least to:
   send, to a network entity acting as a data provider, at least one request to subscribe to or modify at least one data collection service, the request comprising
      a mute notification indication indicating that data collected by the at least one data collection service are to be buffered and a transmission to the data consumer is to be suspended until a predetermined stop condition is satisfied, the stop condition comprising at least one of a time indication and threshold, and
      an indication of a procedure to be conducted by the data provider when an exception condition impairing buffering of the collected data is detected during at least one data collection service.

2. The apparatus according to claim 1, wherein the exception condition impairing buffering of the collected data comprises at least one of
   detecting that a buffering capacity for collected data becomes equal to or lower than a preset value,
   detecting that the buffering capacity for collected data is exhausted, and
   detecting at least one exceptional condition causing that further buffering is not possible at the data provider.

3. The apparatus according to claim 1, wherein the indication of a procedure to be conducted by the data provider comprises at least one of
   at least one indication that affects an action to be executed on buffered data of at least one data collection service,
   at least one indication that affects an action to be executed on a subscription of at least one data collection service, and
   an instruction to negotiate an action to be executed on buffered data of at least one data collection service and an action to be executed on a subscription of at least one data collection service.

4. The apparatus according to claim 3, wherein
   the action to be executed on buffered data of at least one data collection service comprises one of transmitting buffered data to the data consumer when the exception condition impairing buffering of the collected data is detected, or discarding buffered data when the exception condition impairing buffering of the collected data is detected, and wherein
   the action to be executed on the subscription of at least one data collection service comprises one of terminating the subscription of the at least one data collection service, continuing the at least one data collection service of the subscription and the buffering of the collected data, and continuing the at least one data collection service of the subscription but stopping the buffering of the collected data.

5. The apparatus according to claim 1, wherein the at least one memory and the instructions are further configured to, with the at least one processing circuitry, cause the apparatus at least to:
   receive, from the data provider, a response to the at least one request to subscribe to or modify at least one data collection service, and
   process the response,
   wherein the response comprises at least one of
   an indication related to an estimated available buffer capacity and an information related to a changed stop condition being different from the stop condition included in the at least one request to subscribe to or modify at least one data collection service.

6. The apparatus according to claim 1, wherein the at least one memory and the instructions are further configured to, with the at least one processing circuitry, cause the apparatus at least to:
   when the indication of the procedure to be conducted by the data provider comprises an instruction to negotiate the action to be executed on buffered data of at least one data collection service and the action to be executed on a subscription of at least one data collection service, receive, from the data provider, a notification that an exception condition is detected, wherein the notification includes at least one option for the action to be executed on buffered data of at least one data collection service and the action to be executed on a subscription of at least one data collection service to be selected by the data consumer, select, from the at least one option, the action to be executed on buffered data of at least one data collection service and the action to be executed on a subscription of at least one data collection service, and transmit, to the data provider, a response to the notification, the response indicating the selected action to be executed on buffered data of at least one data collection service and the action to be executed on a subscription of at least one data collection service.

7. The apparatus according to claim 6, wherein the at least one memory and the instructions are further configured to, with the at least one processing circuitry, cause the apparatus at least to:

when a plurality of data collection services are subscribed, receive, from the data provider, with the notification that an exception condition is detected, a scope indication defining at least one of the plurality of data collection services for which the exception condition is detected, wherein the action to be executed on buffered data of at least one data collection service and the action to be executed on a subscription of at least one data collection service is selected for the at least one of the plurality of data collection services indicated by the scope indication.

8. The apparatus according to claim 1, wherein the at least one memory and the instructions are further configured to, with the at least one processing circuitry, cause the apparatus at least to:

prepare a prioritization information indicating a priority level for at least one data collection service being subscribed, wherein the priority level indicates an allowability level for actions to be executed for the at least one data collection service when an exception condition is detected, and inform the data provider about the prioritization information.

9. An apparatus for use by a communication network element or communication network function configured to operate as a data provider, the apparatus comprising:

at least one processing circuitry, and at least one memory for storing instructions that, when executed by the processing circuitry, cause the apparatus at least to:

receive, from a network entity acting as a data consumer, at least one request to subscribe to or to modify at least one data collection service, the request comprising a mute notification indication indicating that data collected by the at least one data collection service are to be buffered and a transmission to the data consumer is to be suspended until a predetermined stop condition is satisfied, the stop condition comprising at least one of a time indication and threshold, and an indication of a procedure to be conducted by the data provider when an exception condition impairing buffering of the collected data is detected during at least one data collection service, wherein the at least one memory and instructions, with the at least one processor, are further configured to cause the apparatus to conduct the at least one data collection service and to buffer the collected data according to the mute notification indication, detect whether an exception condition occurs for at least one data collection service, and when the exception condition occurs, conduct a processing according to the indication of the procedure to be conducted by the data provider.

10. The apparatus according to claim 9, wherein the exception condition impairing buffering of the collected data comprises at least one of detecting that a buffering capacity for collected data becomes equal to or lower than a preset value, detecting that the buffering capacity for collected data is exhausted, and detecting at least one exceptional condition causing that further buffering is not possible at the data provider.

11. The apparatus according to claim 9, wherein the instruction regarding a procedure to be conducted by the data provider comprises at least one of at least one indication that affects an action to be executed on buffered data of at least one data collection service, at least one indication that affects an action to be executed on a subscription of at least one data collection service, and an instruction to negotiate an action to be executed on buffered data of at least one data collection service and an action to be executed on a subscription of at least one data collection service.

12. The apparatus according to claim 11, wherein the action to be executed on buffered data of at least one data collection service comprises one of transmitting buffered data to the data consumer when the exception condition impairing buffering of the collected data is detected, or discarding buffered data when the exception condition impairing buffering of the collected data is detected, and the action to be executed on the subscription of at least one data collection service comprises one of terminating the subscription of the at least one data collection service, continuing the at least one data collection service of the subscription and the buffering of the collected data, and continuing the at least one data collection service of the subscription but stopping the buffering of the collected data.

13. The apparatus according to claim 9, wherein the at least one memory and the instructions are further configured to, with the at least one processing circuitry, cause the apparatus at least to:

process the mute notification indication, determine whether a sufficient buffer capacity is available for the preset time and, in case the buffer capacity available for the preset time is not sufficient, send, to the data consumer, a response to the at least one request to subscribe to or modify at least one data collection service, wherein the response comprises at least one of an indication related to an estimated available buffer capacity and a changed stop condition being different from the stop condition included in the at least one request to subscribe to or modify at least one data collection service.

14. The apparatus according to claim 9, wherein the at least one memory and the instructions are further configured to, with the at least one processing circuitry, cause the apparatus at least to:

when the indication of the procedure to be conducted by the data provider comprises at least one indication that affects an action to be executed on buffered data of at least one data collection service and at least one indication that affects an action to be executed on a subscription of at least one data collection service,
select at least one of the actions indicated in the indications and
execute the selected at least one action.

15. The apparatus according to claim 9, wherein the at least one memory and the instructions are further configured to, with the at least one processing circuitry, cause the apparatus at least to:
when the indication of the procedure to be conducted by the data provider comprises an instruction to negotiate the action to be executed on buffered data of at least one data collection service and the action to be executed on a subscription of at least one data collection service,
send, when the exception condition occurs, a notification to the data consumer indicating that the exception condition is detected, wherein the notification includes at least one option for the action to be executed on buffered data of at least one data collection service and the action to be executed on a subscription of at least one data collection service to be selected by the data consumer,
receive, from the data consumer, a response to the notification to the data provider, the response indicating a selected action to be executed on buffered data of at least one data collection service and the action to be executed on a subscription of at least one data collection service, and
execute the selected actions.

16. The apparatus according to claim 15, wherein the at least one memory and the instructions are further configured to, with the at least one processing circuitry, cause the apparatus at least to:
when a plurality of data collection services are subscribed for one data consumer, to determine a scope indication defining at least one of the plurality of data collection services for which the exception condition is detected,
transmit, to the data consumer, the scope indication together with the notification that an exception condition is detected,
wherein the action to be executed on buffered data of at least one data collection service and the action to be executed on a subscription of at least one data collection service is executed for the at least one of the plurality of data collection services indicated by the scope indication.

17. The apparatus according to claim 9, wherein the at least one memory and the instructions are further configured to, with the at least one processing circuitry, cause the apparatus at least to:
obtain prioritization information indicating a priority level for at least one data collection service being subscribed, wherein the priority level indicates an allowability level for actions to be executed for the at least one data collection service when an exception condition is detected, and
execute actions on subscribed data collection services considering the prioritization information.

18. A method for use in a communication network element or communication network function configured to operate as a data consumer, the method comprising
sending, to a network entity acting as a data provider, at least one request to subscribe to or modify at least one data collection service, the request comprising
a mute notification indication indicating that data collected by the at least one data collection service are to be buffered and a transmission to the data consumer is to be suspended until a predetermined stop condition is satisfied, the stop condition comprising at least one of a time indication and threshold, and
an indication of a procedure to be conducted by the data provider when an exception condition impairing buffering of the collected data is detected during at least one data collection service.

19. A method for use in a communication network element or communication network function configured to operate as a data provider, the method comprising:
receiving, from a network entity acting as a data consumer, at least one request to subscribe to or to modify at least one data collection service, the request comprising
a mute notification indication indicating that data collected by the at least one data collection service are to be buffered and a transmission to the data consumer is to be suspended until a predetermined stop condition is satisfied, the stop condition comprising at least one of a time indication and threshold, and
an indication of a procedure to be conducted by the data provider when an exception condition impairing buffering of the collected data is detected during at least one data collection service, the method further comprising
conducting the at least one data collection service and to buffer the collected data according to the mute notification indication,
detecting whether an exception condition occurs for at least one data collection service, and
when the exception condition occurs, conducting a processing according to the indication of the procedure to be conducted by the data provider.

\* \* \* \* \*